United States Patent
Boissonnet et al.

(10) Patent No.: US 9,656,324 B2
(45) Date of Patent: May 23, 2017

(54) CARTRIDGE FOR A GROOVING TOOL HOLDER, CORRESPONDING GROOVING TOOL HOLDER, KIT AND ASSEMBLY THEREOF

(71) Applicant: SANDVIK TOOLING FRANCE, Orleans (FR)

(72) Inventors: Alain Boissonnet, La Chapelle Saint Mesmin (FR); Camille Sandaldjian, Levallois-Perret (FR)

(73) Assignee: SANDVIK TOOLING FRANCE, Orleans (FR)

( * ) Notice: Subject to any disclaimer, the term of this patent is extended or adjusted under 35 U.S.C. 154(b) by 244 days.

(21) Appl. No.: 14/540,080

(22) Filed: Nov. 13, 2014

(65) Prior Publication Data
US 2015/0132074 A1    May 14, 2015

(30) Foreign Application Priority Data
Nov. 14, 2013   (EP) .................................... 13306561

(51) Int. Cl.
*B23B 27/10* (2006.01)
*B23B 27/16* (2006.01)
*B23B 29/04* (2006.01)

(52) U.S. Cl.
CPC .......... *B23B 27/10* (2013.01); *B23B 27/1625* (2013.01); *B23B 29/043* (2013.01); *B23B 2210/08* (2013.01); *B23B 2250/12* (2013.01); *Y10T 407/14* (2015.01)

(58) Field of Classification Search
CPC ..... B23B 27/10; B23B 27/1625; B23B 27/16; B23B 29/043; B23B 29/12; B23B 2210/08; B23B 2250/12
See application file for complete search history.

(56) References Cited

U.S. PATENT DOCUMENTS

| 4,848,198 A  * | 7/1989  | Royal ..................... B23B 25/02 407/11 |
| 5,993,118 A    | 11/1999 | Brask et al. |
| 6,249,950 B1   | 6/2001  | Brask et al. |
| 2003/0206777 A1 | 11/2003 | Gyllengahm |

(Continued)

FOREIGN PATENT DOCUMENTS

| BE | 883845 A1 | 10/1980 |
| DE | 2518395 A1 | 10/1976 |
| GB | 1369096 A  * | 10/1974 ............. B23B 27/08 |

(Continued)

*Primary Examiner* — Sunil K Singh
*Assistant Examiner* — Alan Snyder
(74) *Attorney, Agent, or Firm* — Corinne R. Gorski

(57) ABSTRACT

A cartridge for a grooving tool holder extends along a mid-thickness plane by being bordered in the mid-thickness plane by peripheral surfaces of the cartridge. The peripheral surfaces of the cartridge include a clamping surface, a back surface for the fixation to the grooving tool holder along a screwing direction, and a front surface. The cartridge has a coolant channel extending along a direction from the back surface to the front surface. The screwing direction and the direction of extension of the coolant channel are both included in the mid-thickness plane of the cartridge. A grooving tool holder includes an upper front surface for fixation by screwing to the back surface of the cartridge.

20 Claims, 4 Drawing Sheets

(56) References Cited

U.S. PATENT DOCUMENTS

2010/0178117 A1 7/2010 Watanabe et al.
2011/0070037 A1* 3/2011 Baker .................... B23B 27/10
                                                                407/11

FOREIGN PATENT DOCUMENTS

| JP | H07227702 A | 8/1995 |
| JP | 2002346810 A * | 12/2002 |
| WO | 98/57769 A1 | 12/1998 |

* cited by examiner

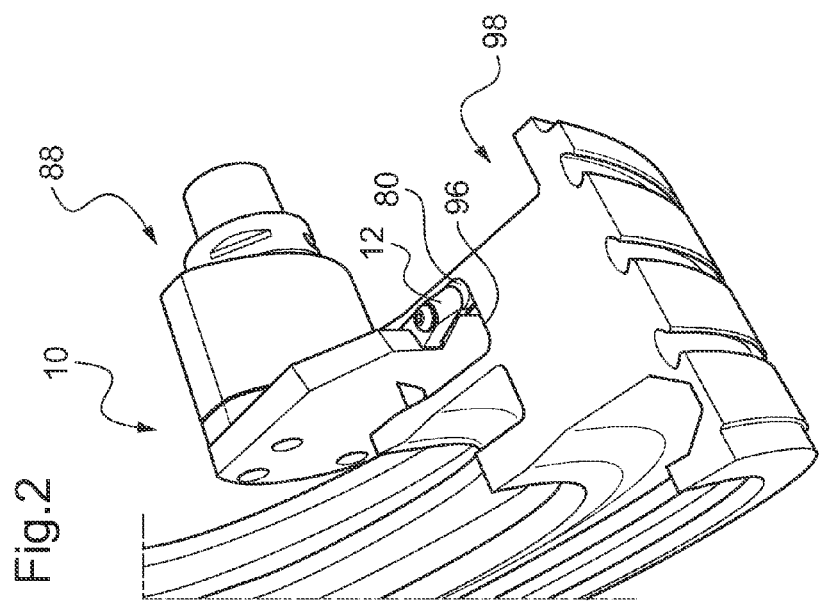
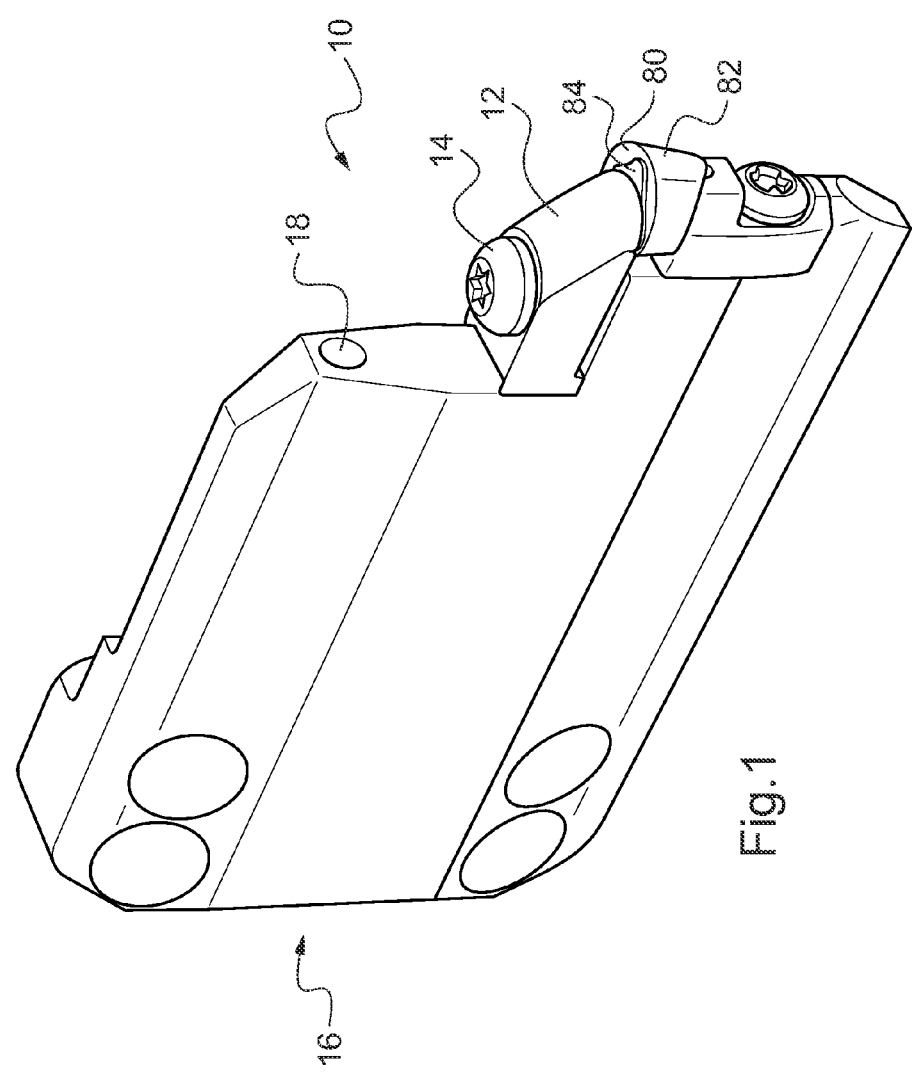

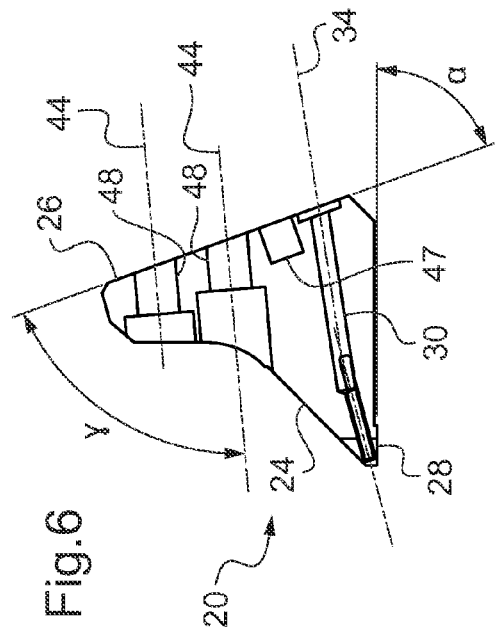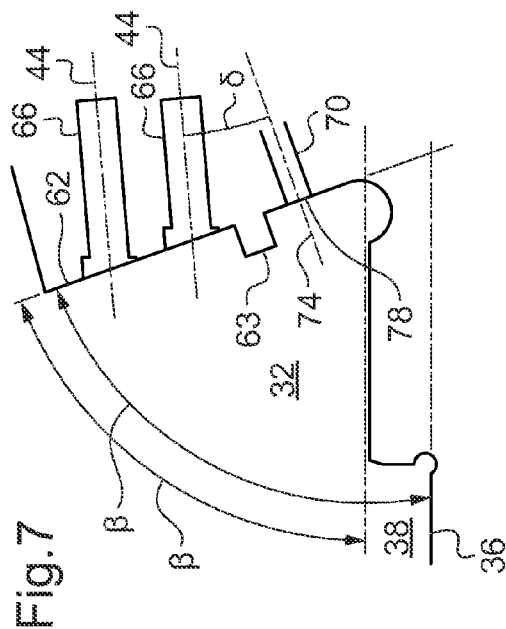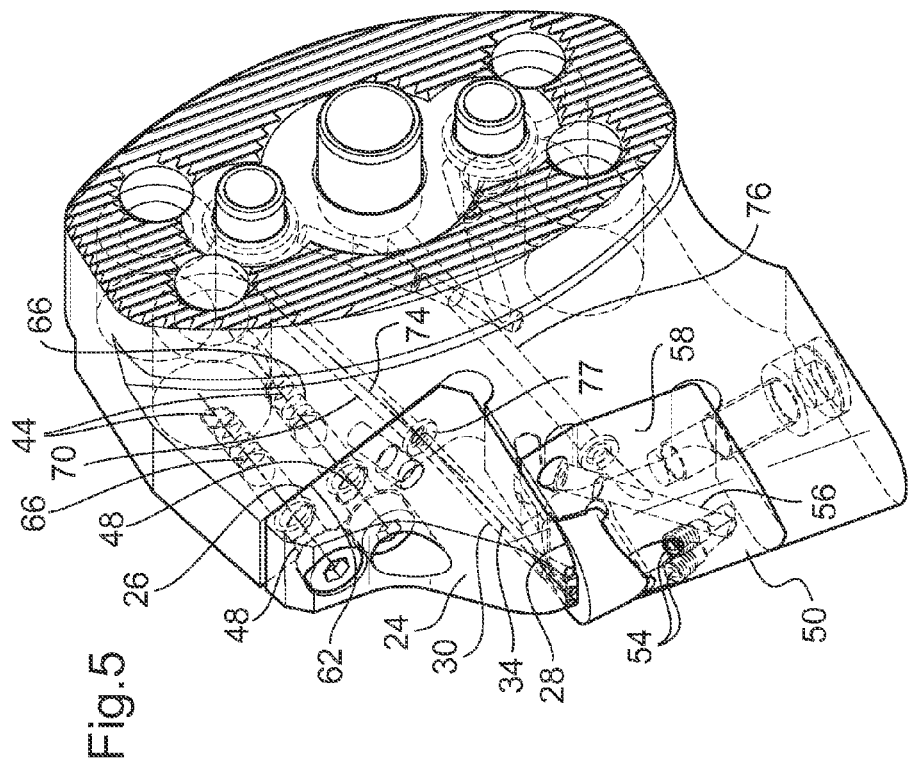

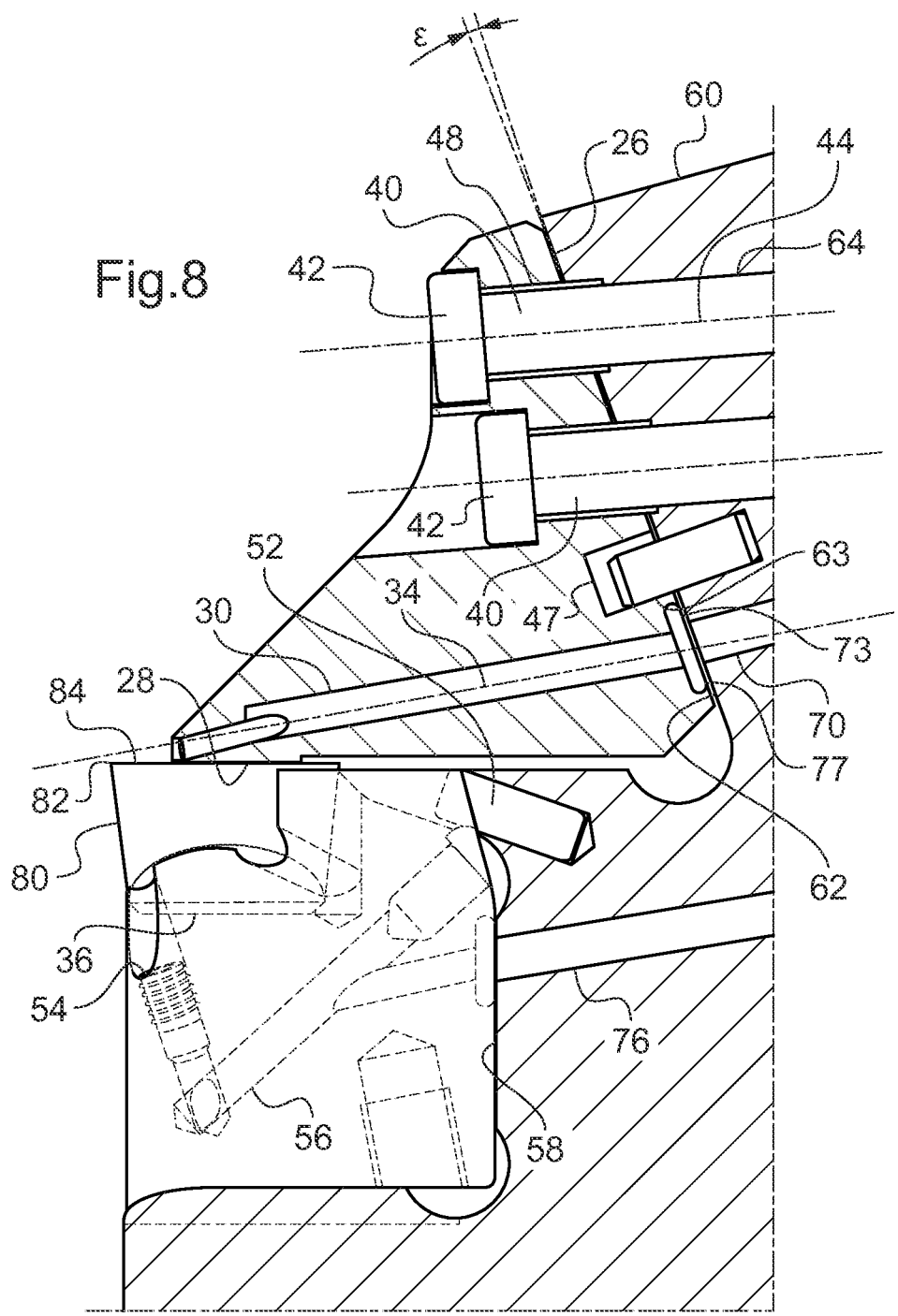

CARTRIDGE FOR A GROOVING TOOL HOLDER, CORRESPONDING GROOVING TOOL HOLDER, KIT AND ASSEMBLY THEREOF

RELATED APPLICATION DATA

This application claims priority under 35 U.S.C. §119 to EP Patent Application No. 13306561.5, filed on Nov. 14, 2012, which the entirety thereof is incorporated herein by reference.

TECHNICAL FIELD

The present disclosure relates to a cartridge for a grooving tool holder, and to a grooving tool holder adapted to receive the cartridge for clamping a cutting insert.

BACKGROUND

The technical field of machining by grooving is a part of the general field of machining by turning. This particular technical field of machining is subject to the constraint of accessibility of the surface to groove, notably the head of the grooving tool should be sufficiently long to machine the bottom of the machined groove and sufficiently narrow to enter the machined groove whilst leaving enough space for chip evacuation.

Further, the constraint of accessibility is reinforced when machining a deep groove, as in the deep grooving of a turbine disk. FIG. 1 shows a known assembly 10 of a grooving tool holder 16 with a clamp 12 for clamping the cutting insert 80 on the grooving tool holder 16. The clamp 12 is fixed by a screw 14 disposed in the portion of the assembly 10 that enters the machined groove. This type of assembly, also referred to as a "blade", allows, as shown in FIG. 2, the machining of a deep groove 96 in a turbine disk 98. Blade 10 may be assembled to an adaptor system 88, providing precise positioning and coolant to the blade 10. Blade 10 is provided with a coolant channel 18 for cooling the working cutting edge 82 of the cutting insert 80. However the cooling direction, and consequently the jet impact of the coolant, is fixed by the tool holder 10.

SUMMARY

The present disclosure provides a cutting tool for deep grooving having a better flexibility on the jet impact of the coolant.

In one aspect, there is disclosed a cartridge for a grooving tool holder, the cartridge extending along a mid-thickness plane flanged between a left side and a right side. An extension of the cartridge along the mid-thickness plane is bordered in the mid-thickness plane by peripheral surfaces of the cartridge. The peripheral surfaces of the cartridge include a clamping surface for clamping by contact a cutting insert in the grooving tool holder; a back surface for the fixation by screwing of the cartridge to the grooving tool holder along a screwing direction; and a front surface. The cartridge includes a coolant channel extending along a direction from the back surface to the front surface. A screwing direction and the direction of extension of the coolant channel are both included in the mid-thickness plane of the cartridge.

In another aspect the clamping surface forms clamping plane for contact with an upper side of the cutting insert and the back surface extending along a plane. The angle formed between the plane of the back surface and the clamping plane being lower or equal to 70°. The back surface includes two screw holes for the fixation by screwing of the cartridge to the grooving tool holder along the screwing direction. The back surface extends along a plane, an acute angle formed between the plane of the back surface and the screwing direction being greater or equal to 60°, and/or greater or equal to 75°. The back surface includes a recess for receiving a lateral positioning pin of the grooving tool holder during fixation of the cartridge to the grooving tool holder by screwing. The thickness of the cartridge is lower than 20 mm, for example, lower than 13 mm.

In still another aspect, a grooving tool holder for the machining of a work piece by turning with a removal of material from the work piece on a upper side of the grooving tool holder, includes an upper front surface for the fixation by screwing to the back surface of the proposed cartridge; a front recess for receiving the cartridge and a cutting insert; and an upper coolant channel ending on the upper front surface.

The grooving tool holder has a lower portion of the front recess adapted to receive a removable shim defining a pocket for a cutting insert; a lower front surface defining the lower portion of the front recess; and a lower coolant channel ending on the lower front surface. The grooving tool holder can be assembled with the removable shim screwed to the tool holder, thereby defining the pocket for receiving a cutting insert. The removable shim includes a coolant channel continuing the coolant channel of the grooving tool holder so as to lubricate the work piece on the clearance side of the cutting insert.

The grooving tool holder can include a pocket for receiving a cutting insert, wherein the pocket includes a straight bottom for the positioning in a cutting position of a cutting insert received in the pocket. A upper front surface extends along a plane. An angle formed within the front recess from the straight bottom and the extension plane of the upper front surface being lower or equal to 75°, for example, lower or equal to 70°.

The grooving tool holder presents a portion adapted to enter a machined groove during turning. The portion extends along a mid-thickness plane orthogonal to the rotating axis of the work piece during turning, the direction of extension of the coolant channel on the upper front surface and the screwing direction of the upper front surface forming, in the mid-thickness plane, an angle lower or equal to 30°, for example, lower or equal to 15°. The portion can have a thickness lower than 20 mm, for example, lower than 13 mm.

In yet another aspect, there is provided a kit including the cartridge and the grooving tool holder. The cartridge has a clamping surface forming a clamping plane for contact with an upper side of a cutting insert received in the pocket of the tool holder. The back surface of the cartridge extends along a plane. The grooving tool holder has an upper front surface extending along a plane, and the grooving tool holder including a pocket having a straight bottom for being positioned in a cutting position of a cutting insert received in the pocket. A recess is formed in the grooving tool holder between the straight bottom of the pocket and the upper front surface for receiving the cutting insert and the cartridge. The angle formed within the recess from the straight bottom and the extension plane of the upper front surface of the tool holder being lower of at least 0.25° than the angle formed between the plane of the back surface and the clamping plane of the cartridge.

It is further proposed an assembly of the proposed kit and of a cutting insert, wherein the grooving tool holder includes a pocket, the cutting insert being clamped in the pocket by the cartridge screwed on the back surface to the upper front surface of the tool holder.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 1 is a perspective view of a known cutting tool for deep grooving.

FIG. 2 is a perspective view of the cutting tool according to FIG. 1 during grooving of a cut-away turbine disk.

FIG. 5 is a perspective view of another embodiment of the cartridge assembled to a grooving tool with a cutting insert of the present disclosure.

FIG. 6 is a cut away view of the cartridge of FIG. 5.

FIG. 7 is a cut away view of a front recess of the cutting tool according to FIG. 6, for receiving the cartridge according to FIG. 5.

FIG. 8 is a cross-sectional view with an enlarged broken-out section of the cartridge and on cutting insert assembly of FIG. 5.

DETAILED DESCRIPTION

Figure 3:
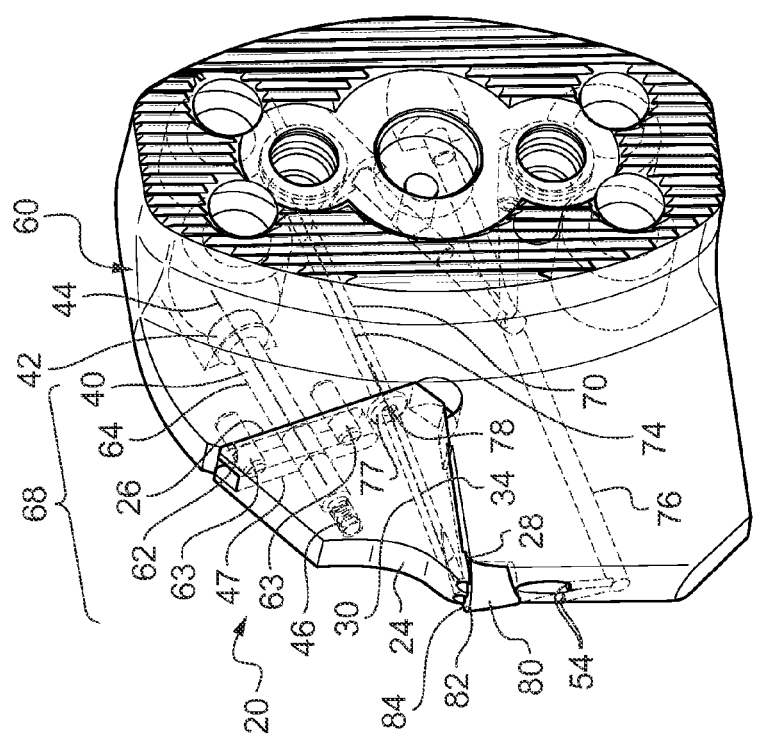
FIG. 3 is a perspective view of a cartridge assembled to a grooving tool with a cutting insert of the present disclosure.

The present disclosures relates to a cartridge for a grooving tool holder using cutting inserts. FIG. 3 shows one embodiment of a cartridge 20 assembled to a grooving tool holder 60. The cartridge 20 and the grooving tool holder 60 are shown transparently so as to see the internal structure of these parts.

The cartridge 20 corresponds to a clamp for the clamping of a cutting insert 80 in the grooving tool holder 60, shown in a solid view. Cutting insert 80 is received in a pocket of the grooving tool holder 60 with a cutting edge 82 disposed on a front side of the assembly, this cutting edge 82 being disposed in a position for machining a groove on the upper side of the assembly, the material of the groove being removed as chips. In others words, the front side is facing the direction of the depth of the groove and the upper side is the side of entry of the cutting edge in the material to be machined. In contrast, the back side of the cartridge 20 of the tool holder 60 or of the assembly herein, corresponds to the side away from the groove to be machined, and the bottom side corresponds to the side of clearance of the cutting insert 80 when disposed in the machining position. Further, the left side and the right side are defined herein in reference to the previous front and upper sides. Thus, the left side and a right side respectively correspond to the background side and the foreground side of the perspective view shown in FIG. 3.

In reference to the above definitions of sides, the cartridge 20 and a portion 68 of the tool holder 60 are designed to enter the groove to be machined from the front side. The assembly of the cartridge 20 and of the tool holder 60 is notably designed to perform deep grooving of a groove 86 of the turbine disk 98 previously shown in FIG. 2. Accordingly the thickness of the cartridge 20 and the thickness of the portion 68 of the tool holder designed to enter the groove to be machined are particularly constrained.

Figure 4:
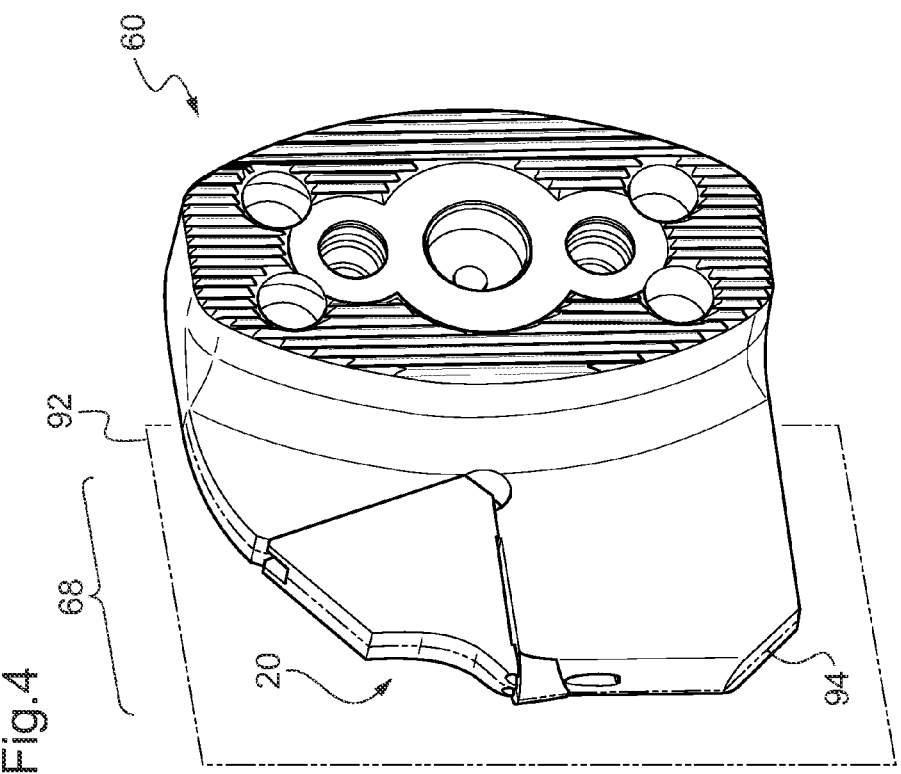
FIG. 4 is a perspective view of FIG. 3 illustrating the mid-thickness plane.

The cartridge 20 and the portion 68 exhibit a flat shape, flanged between the left side and the right side. In other words, a plate form flanged between the left side and the right side. The flat shape of the cartridge 20 and of the portion 68 of the tool holder could also be characterized by the respective expressions: the cartridge 20 extends along a mid-thickness plane and the portion 68 of the tool holder extends along a mid-thickness plane. In other words, the cartridge 20 and the portion 68 of the tool holder extend in a central plane, i.e. a plane in the middle, between the two left and right side surfaces. This mid-thickness plane is shown in FIG. 4, under reference sign 92 and projects on the surfaces of the cartridge 20 and of the portion 68 of the tool holder 60 along a line 94.

When extending along the mid-thickness plane and flanged between a left side and the right side, the cartridge 20 is bordered, on its other sides, by peripheral surfaces of the cartridge 20. The cartridge 20 can be a clamp for the cutting insert 80, the peripheral surfaces of the cartridge 20 including a clamping surface 28. This clamping surface 28 is designed to clamp the cutting insert 80 by contact to an upper surface 84 of the cutting insert 80 disposed in the pocket of the tool holder 60. The clamping surface 28 corresponds to a bottom surface of the cartridge 20, in reference to the above-defined sides. Further, the peripheral sides of the cartridge also include a back surface 26 and a front surface 24.

The back surface 26 allows the fixation of the cartridge 20 to the grooving tool holder 60. This fixation is made by screwing a screw 40 along a screwing direction 44. The screwing direction is defined by the direction of extension of the screw 40 into the cartridge 20. The screw 40 is shown with a head 42 on the back side, i.e. accessible on the side of the tool holder. Alternatively, the screw 40 could present its head 42 on the front side, i.e. accessible from the side of the cartridge 20, as shown in FIG. 5 for another cartridge 20. Depending on the side on which the screw 40 is to be screwed in for the fixation of the cartridge 20, the cartridge 20 includes a hole, possibly blind as shown in FIG. 3, with an internal thread 46 or a through hole 48, possibly without thread as shown in FIG. 5.

Independently from the side of the screwing, the screwing could be made with one screw 40, as shown in FIG. 3, two screws 40, as shown in FIG. 5, or more. With multiple screws 40 for the fixation of the cartridge 20 to the tool holder 60, the direction of screwing is to be understood as being any one of the directions of extension for any screw 40 that, alone, allows the clamping of the cutting insert 80 to the tool holder 60 by means of the cartridge 20. According to FIG. 5, each single screw of the screws 40 is able to clamp the cutting insert 80 to the tool holder 60 by means of the cartridge 20. The use of both screws however offers a security of holding the cartridge 20 in place in the event that one screw breaks during machining.

The cartridge 20 also includes a coolant channel 30 extending from the back surface 26 to the front surface 24. Coolant channel 30 extends between surfaces 24 and 26 along a direction of extension 34. The direction of extension 34 is to be understood as the average or main direction of extension of the coolant channel 30 so that the coolant channel 30 may possibly be angled. Indeed the coolant channel 30 may be formed of a continuation of bored holes having various directions of boring, thereby forming angles. However, the possible angles of the coolant channel 30 can be lower than 45°, for example, lower than 30° to avoid friction loss for the coolant. The cartridge 20 and the tool holder 60 may be designed to machine with high pressure coolant, notably coolant with pressure greater or equal to 150 bar, but also up to 500 bar.

The direction of extension 34 of the coolant channel and the screwing direction 44 are both included in the mid-thickness plane of the cartridge 20. FIG. 6 shows a cut view of the cartridge 20 of FIG. 5, in the mid-thickness plane, thereby showing the extension of the coolant channel 30 and of the through holes 48 for screwing. The through holes 48 and the coolant channel 30 respectively extend along the direction 44 and the direction 34, both of which are included in the plane of FIG. 6. In other words, the coolant channel's direction 34 and the screwing direction 44 extend at mid-thickness of the flat shape of the cartridge 20. It is to be understood that the inclusion of the screwing direction 44 and of the coolant channel's direction 34 in the mid-thickness plane are encompassing directions that could present an angle with respect to the mid-thickness plane being equal or lower than 10°.

The disposition at the same thickness of the screwing and of the coolant allows the construction of the cartridge 20 and of the portion 68 of the tool holder 60 with a reduced thickness. This thickness reduction of cartridge 20 and of the portion 68 can be relative to the width of the screws 40 and/or of the coolant channel 30. For example, the thickness of the cartridge 20 may be lower than triple or double of the width of the shank of the screw 40 and/or of the width of the coolant channel 30.

The limitation of the thickness of the cartridge 20 and of the portion 68 may also be absolute. For example the thickness of the cartridge 20, as well as the thickness of the portion 68 of the tool holder could be chosen within the following thicknesses: 6.35, 9.52 or 12.7 mm or any other thickness lower than 20 mm, for example, lower than 13 mm.

The limitation of the thickness of the cartridge for the clamping of the cutting insert 80 in a grooving tool holder is also a constraint for the known grooving assembly 10 shown in FIG. 1. However the cartridge further provides the disposition of a coolant channel 30 in the cartridge 20 within this same thickness as the fixation screws 40, one being above the other. Indeed, as shown, the coolant channel 30 may be disposed within the cartridge 20, under the screws 40, so as to be close to the cutting edge 82 to lubricate. The direction of coolant flow of the coolant being determined by the coolant channel 30 of the cartridge 20, the jet impact could be varied from a cartridge 20 to another without changing the tool holder 60.

The cartridge 20 being a smaller and simpler part than the tool holder 60 allows the assembly of a tool holder and a cutting insert for deep grooving with a better flexibility with respect to the jet impact of the coolant.

Further, the disposition of the cooling channel 30 within the cartridge 20, allows the coolant channel 30 to be near the working cutting edge 82 of the cutting insert 80. Relative to the previously known solution shown in FIG. 1, the cartridge 20 limits the interposition of chips between the coolant jet and the cutting edge. The coolant capacity of the tool used with the cartridge 20 is thereby improved. Besides, the cooling channel 30 ending between the working cutting edge 82 of the cutting insert 80 and the head of the screw 40, the cartridge 20 limits the risk of chips swirling around the screw 40 during machining.

As shown in FIG. 6, the cartridge 20 may present a wedge form with an angle α between the clamping surface 28 and the back surface 26. To define precisely the angle α, the clamping surface 28 and the back surface 26 of the cartridge 20 extend straightly. Thus, the clamping surface 28 may form a clamping plane and the back surface 26 of the cartridge 20 may extend along a plane. To reduce the material of the cartridge 20, the angle α is acute. Accordingly the angle α may be lower or equal to 75°, for example, lower or equal to 70°. Nevertheless, the angle α should be sufficiently large so that the fixation of the cartridge 20 by screwing does not hinder the coolant channel 30.

As described herein, a coolant channel may also be designated as a coolant line. Further a large acute angle α allows for the cartridge 20 to present a large front surface 24, so that the cartridge 20 could be used as a removable wearing part of the grooving assembly. The front face of a grooving assembly is indeed subject to contact with the chips removed during machining. The removability of the cartridge 20 thus further allows to limit the wearing of the tool holder 60, the removable cartridge 20 enduring the wear of the chips removed during machining.

As previously illustrated by the known grooving tool 10 of FIG. 1, such a thickness of the cartridge 20, possibly limited to the width to the cutting insert 80, is advantageous for deep grooving operations. Indeed rigid clamping larger than the width of the cutting insert limits the total depth of the groove to less than the length of the cutting insert. The cartridge 20, clamping the cutting insert with a limited thickness, possibly lower than the width of the cutting insert 80, thus allows to machine deeper than the length of the cutting insert 80.

While allowing grooving deeper than the length of the cutting insert, the limitation of the thickness of the cartridge 20 to the width of the cutting insert 80 is further advantageous by allowing such a deep grooving with a limitation of the vibration of the tool holder 80 and of the clamping system. The limitation of the vibration is relative to the vibration to which is subjected a screwing of a clamping system that will be offset because being too large to enter the machined groove. The cartridge 20 with a limited thickness allows disposing entirely the clamping system of the cutting insert within the portion 68 of the tool holder entering the groove during machining. The distance between the cutting insert and the fixation of the clamping system to the tool holder could thus be reduced, e.g. to three times the length of the cutting insert to avoid excessive vibration during machining, without limiting the depth of the groove as for the offset clamping.

The grooving tool holder 60 also contributes to giving the assembled grooving tool for deep grooving a better flexibility with respect to direction of flow of the coolant. Accordingly, the grooving tool holder 60 has an upper front surface 62 for the fixation of the cartridge 20. This upper front surface 62 is designed to receive the back surface 26 of the cartridge 20 and thus to be screwed to the cartridge 20. For attaching to the cartridge 20, the upper front surface 62 may have screwing means such as a through hole 64, as shown in FIG. 3, or a hole with an internal thread 66, as shown in FIG. 5. This through hole 64, or internal thread 66 defines a screwing direction corresponding to the screwing direction 44 already described for the cartridge 20.

To allow the reception of the cartridge 20 in front of the upper front surface 62, the grooving tool holder 60 includes a front recess. FIG. 7 shows a cut view of the front recess 32 of the tool holder 60 in the mid-thickness plane of the portion 68 of the tool holder designed to enter the groove during deep grooving. This front recess allows also the reception of the cutting insert 80. In other words, the front recess 32 includes the pocket 38 of the tool holder 60 and an upper portion for the reception of the cartridge 20. The front recess 32 of the tool holder 60 could form an angle β from the bottom of the pocket of the tool holder 60 and the upper front surface 62. This angle β corresponds to the angle α formed by the cartridge 20 and illustrated in FIG. 6. The cartridge 20 and the corresponding tool holder 60 form a kit of parts ready to be assembled. The assembly of these parts is also with the cutting insert 80 clamped in the pocket formed the tool holder 60 by the cartridge 20 screwed on its back face 26 to the upper front surface 62 of the tool holder.

Similarly to the above-mentioned angle α, to define precisely the angle β, the pocket 38 and the upper front surface 62 of the tool holder 60 preferably extend straightly. Thus the pocket 38 may have a straight bottom 36 and the upper front surface 62 may extend along a plane. The straight bottom 36 of the pocket 38 may correspond to the bottom line of a V-shaped pocket 38 as shown in FIGS. 3 and 4. Alternatively, the bottom of the pocket may not have a straight bottom, but a bottom formed such that, when an insert is placed in the holder, a cutting plane of the insert is straight. In such an alternative the cutting plane of the insert forms the angle β with the front surface when viewed in this longitudinal section.

In correspondence to above-mentioned angle α, the angle β can be acute and notably may be lower or equal to 75°, for example, lower or equal to 70°.

To allow the clamping of the cutting insert 80, the cartridge 20 and the tool holder 60 are chosen to present angles α and β with a predetermined slight difference so as to compensate the manufacturing tolerance of the parts. For example, the angle β may be lower of at least 0.25° from the angle α, even when the manufacturing tolerances are taken into account. This difference of at least 0.25° may correspond to a designed angle α of 70.25° with a superior fabricating tolerance of 0.25° and an inferior fabricating tolerance of 0° and to a designed angle β of 69.75°±0.125° as fabricating tolerance. Such a cartridge 20 and tool holder 60 are also as a kit. The slight difference may also be of 0.5° or even of 0.625°. This slight difference is shown in the side view with a broken out section of FIG. 8 by the angle ε between the back face 26 of the cartridge 20 and the upper front surface 62 of to the tool holder 60 during assembly. Before attachment of the parts for clamping, a cutting insert 80 has been placed in the pocket 38, the clamping surface 28 of the cartridge 20 is positioned against the upper surface 84 of the cutting insert 80, the difference between the angle α and β resulting in the angle ε. During assembly, this angle ε between the back face 26 of the cartridge 20 and the upper front surface 62 of to the tool holder 60 is reduced by the screwing in of the screws 40 connecting the cartridge 20 and the tool holder 60. This attaching and the reduction of the angle ε, induce the tilting of the cartridge 20 against the upper surface 84 of the cutting insert, thereby securing the clamping. To facilitate the tilting of the cartridge 20 during fixation by screwing, the acute angle γ formed between the plane of the back surface 26 and the screwing direction 44 may be greater or equal to 60°, for example, greater or equal to 75°.

Assembling by screwing the cartridge 20 to the tool holder 60 may be facilitated by the use of lateral positioning pins 63, for example, as shown in FIGS. 4 and 7 or two as shown in FIG. 3. These lateral pins 63 are disposed on the upper front surface 62 of the tool holder 60 and correspond to at least a recess 47 on the back surface 26 of the cartridge 20. In alternative embodiments (not illustrated), the lateral positioning pins 63 may be disposed on the cartridge 20 and received in a recess disposed in the tool holder 60.

As shown in FIGS. 4 and 7, the front recess 32 of the tool holder 60 could have a lower portion to receive a removable shim 50. Similarly to the cartridge 20, the removable shim 50 may be used as a wear part of the grooving assembly. In other words, the removable shim may endure the wear induced by the occurrence of hits between the work piece and the grooving assembly. This removable shim 50 defines the pocket 38 for the cutting insert 80 by delimiting the bottom and the back of the pocket 38. The pocket 38 is also referred as the nest or the insert seat of the cutting insert 80. The lower portion of the front recess is itself defined by a lower front surface 58 of the tool holder 60.

The tool holder 60 has an upper coolant channel 70 and, possibly, a lower coolant channel 76 for respectively providing the upper side and the lower side of the cutting insert 80 with coolant. These coolant channels 70 and 76 end on the upper front surface 62 and the lower front surface 76, respectively. The upper coolant channel 70 continues, after its ending 78 on the upper front surface 62, as the coolant channel 30 of the cartridge 20 when the cartridge 20 is received and fixed in the tool holder 60. The sealing between coolant channels 30 and 70 is preferably ensured with the use of a seal 77, shown in the form of an O-ring, placed at the coolant line end 78. Seal 77 is compressed when the cartridge 20 is screwed into place, thus sealing any unwanted gap between the coolant channels 30 and 70. The continuation of the coolant channel 30 of the cartridge 20 by the coolant channel 70 of the tool holder 60 could either be in the same direction 34 or, as shown, according to another direction 74 having a slight angle. The disposition of both the ending 78 of the coolant channel 70 and the screwing means at the upper front surface 62 allows the reception of the cartridge 20 having the direction 34 of the coolant channel 30 and the screwing direction 44 in the mid-thickness plane of the cartridge 20. The direction of extension 74 of the coolant channel 70 on the upper front surface 62 and the screwing direction 44 of the upper front surface 62 may form an acute angle δ as shown in FIG. 7. For ease, a compact design of the cartridge 20 cooperating with the tool holder 60, the angle δ may be lower or equal to 30°, for example, lower or equal to 15°.

The lower coolant channel 76 could end either under the cutting insert 80, as shown in the embodiment of FIG. 3, or on the lower front surface 58, as shown in the embodiment of FIGS. 4 and 7. Indeed, in the embodiment of FIG. 5, the coolant channel 76 of the tool holder 60 is continued by a coolant channel 56 of the removable shim 50 to end under, i.e. on the clearance side of, the cutting insert 80 with nozzles 54. As shown, the removable shim 50 may be fixed to the tool holder 60 by screwing. Similarly to the cartridge 20, the coolant channel 56 and the screwing direction of the removable shim 50 may both extend in the mid-thickness plane of the removable shim 50 to limit the thickness of the shim 50.

Again similarly to the assembly of the cartridge 20 to the tool holder 60, the assembly of the removable shim 50 may be facilitated with the use of lateral positioning pin 52, shown disposed on the lower front surface 58 of the tool holder 60. A corresponding recess is disposed in the shim as to facilitate the lateral positioning of the shim 50 during screwing to the tool holder 60. In alternative embodiments (not illustrated), the lateral positioning pins 52 may be disposed on the removable shim 50 and received in a recess disposed in the tool holder 60.

Although a limited number of embodiments and their components have been specifically described and illustrated herein, many modifications and variations will be apparent. Notably the fixation screw 40 may be replaced by two fixation screws 40, with or without a change of the side on which the screws are accessible. The lateral positioning pin may also be disposed on the bottom of the upper portion of the front recess 32 in addition or in alternative to the positioning pin 63 shown in FIG. 7.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A cartridge for a grooving tool holder, the cartridge extending along a mid-thickness plane and flanged between a left side and a right side, the extension of the cartridge along the mid-thickness plane being bordered in the mid-thickness plane by peripheral surfaces of the cartridge, the peripheral surfaces of the cartridge comprising:
    a clamping surface for clamping by contact with a cutting insert in the grooving tool holder;
    a back surface for the fixation by screwing of the cartridge to the grooving tool holder along a screwing direction; and
    a front surface;
    the cartridge including a coolant channel extending along a direction of extension from the back surface to the front surface, the coolant channel being disposed within the cartridge between the clamping surface and the screwing direction, the screwing direction and the direction of extension of the coolant channel being both included in the mid-thickness plane of the cartridge.

2. The cartridge according to claim 1, the clamping surface forming a clamping plane for contact with an upper side of the cutting insert and the back surface extending along a plane, wherein an angle formed between the plane of the back surface and the clamping plane being lower or equal to 70°.

3. The cartridge according to claim 1, wherein the back surface includes two screw holes for fixation by screwing of the cartridge to the grooving tool holder along the screwing direction.

4. The cartridge according to claim 1, the back surface extending along a plane, an acute angle formed between the plane of the back surface and the screwing direction being greater or equal to 60°.

5. The cartridge according to claim 1, wherein the back surface includes a recess for receiving a lateral positioning pin of the grooving tool holder during fixation of the cartridge to the grooving tool holder.

6. The cartridge according to claim 1, wherein a thickness of the cartridge is less than 20 mm.

7. A grooving tool holder for the machining of a work piece by turning with a removal of material from the work piece on an upper side of the grooving tool holder, the grooving tool holder comprising:
    an upper front surface for the fixation by screwing to the back surface of a cartridge, the cartridge extending along a mid-thickness plane and flanged between a left side and a right side, an extension of the cartridge along the mid-thickness plane being bordered in the mid-thickness plane by peripheral surfaces of the cartridge, the peripheral surfaces of the cartridge including a clamping surface for clamping by contact with a cutting insert in the grooving tool holder, a back surface for the fixation by screwing of the cartridge to the grooving tool holder along a screwing direction, and a front surface, the cartridge including a coolant channel extending along a direction of extension from the back surface to the front surface, the coolant channel being disposed within the cartridge between the clamping surface and the screwing direction, the screwing direction and the direction of extension of the coolant channel being both included in the mid-thickness plane of the cartridge;
    a front recess for receiving the cartridge and a cutting insert; and
    an upper coolant channel ending on the upper front surface.

8. The grooving tool holder according to claim 7, further comprising:
    a lower portion of the front recess arranged to receive a removable shim defining a pocket for a cutting insert;
    a lower front surface defining the lower portion of the front recess; and
    a lower coolant channel ending on the lower front surface.

9. The grooving tool holder according to claim 8, wherein when assembled the removable shim is screwed to the tool holder to define the pocket for receiving a cutting insert, the removable shim having the coolant channel continuing the coolant channel of the grooving tool holder so as to lubricate the work piece on the clearance side of the cutting insert.

10. The grooving tool holder according to claim 9, wherein the pocket includes a straight bottom for positioning in a cutting position of a cutting insert received in the pocket, the upper front surface extending along a plane; and an angle formed within the front recess from the straight bottom and the extension plane of the upper front surface being lower or equal to 75°.

11. The grooving tool holder according claim 7, wherein a portion is arranged to enter a machined groove during turning, the portion extending along the mid-thickness plane orthogonal to the rotating axis of the work piece during turning, the direction of extension of the coolant channel on the upper front surface and the screwing direction of the upper front surface forming, in the mid-thickness plane, an acute angle lower or equal to 30°.

12. The grooving tool holder according to claim 11, wherein the portion has a thickness lower than 20 mm.

13. The cartridge according to claim 4, wherein the acute angle formed between the plane of the back surface and the screwing direction is greater or equal to 75°.

14. The cartridge according to claim 6, wherein the thickness of the cartridge is, less than 13 mm.

15. The grooving tool of claim 10, wherein the angle is less than or equal to 70°.

16. The grooving tool of claim 11, wherein the acute angle is less than or equal to 15°.

17. The grooving tool of claim 12, wherein the portion has a thickness less than 13 mm.

18. A kit comprising a cartridge and a grooving tool holder, the cartridge extending along a mid-thickness plane and flanged between a left side and a right side, the extension of the cartridge along the mid-thickness plane being bordered in the mid-thickness plane by peripheral surfaces of the cartridge, the peripheral surfaces of the cartridge including a clamping surface for clamping by contact with a cutting insert in the grooving tool holder, a back surface for the fixation by screwing of the cartridge to the grooving tool holder along a screwing direction, and a front surface, the cartridge including a coolant channel extending along a direction of extension from the back surface to the front surface, the coolant channel being disposed within the cartridge between the clamping surface and the screwing direction, the screwing direction and the direction of extension of the coolant channel being both included in the mid-thickness plane of the cartridge, and the grooving tool holder including a front recess for receiving the cartridge and a cutting insert, and an upper coolant channel ending on the upper front surface.

19. The kit according to claim 18, wherein the clamping surface of the cartridge forms a clamping plane for contact with an upper side of the cutting insert received in the pocket of the tool holder, and the back surface of the cartridge extending along a plane; the grooving tool holder having an upper front surface extending along a plane, and the grooving tool holder including a pocket having a straight bottom for the positioning in a cutting position of the cutting insert received in the pocket, the recess being formed in the grooving tool holder between the straight bottom of the pocket and the upper front surface for receiving the cutting insert and the cartridge; and an angle formed within the recess from the straight bottom and the extension plane of the upper front surface of the tool holder being at least 0.25° less than an angle formed between the plane of the back surface and the clamping plane of the cartridge.

20. The kit according to claim 19, wherein the back surface of the cartridge and the upper front surface of the grooving tool holder are arranged to clamp the cutting insert in the pocket.

* * * * *